United States Patent Office 3,507,019
Patented Apr. 21, 1970

3,507,019
METHOD FOR MANUFACTURING SCREENS FOR PAPERMAKING
Takuo Tate, Tokyo, Japan, assignor to Kabushiki Kaisha Sayama Seisakusho, Tokyo, Japan
No Drawing. Filed Apr. 10, 1968, Ser. No. 720,367
Int. Cl. D02j 1/22
U.S. Cl. 28—75                        3 Claims

ABSTRACT OF THE DISCLOSURE

A process for manufacturing endless screens for a papermaking machine from natural and artificial fibers characterized by impregnating and coating said yarn with a mixture of resin curable with a curing agent and a curing agent in amount enough to partly cross-link said resin to a thermoplastic state, heat-treating said yarn to partly cross-link, making an endless screen using said treated yarn at least as the wefts, applying a solution of curing agent to said screen and heating said screen while stretching the same in the warp direction to effect heat-setting and curing of the resin simultaneously, thereby to provide a smooth surface and wrinkleless and long life endless screen for papermaking machine.

---

This invention relates to a method for manufacturing endless screens of natural and artificial fibers for paper making.

Heretofore, wire cloths formed principally of metal wires have been used as the wires or screens for paper making. The metallic wire cloths have various defects such as their handling and fitting to the paper manufacturing machine being difficult because of heavy weight, high hardness and deformability of the wire. Furthermore, they are not satisfactory in such properties as resistance to abrasion, bending, chemicals, particularly to acids. During paper making, the wires or screens are subjected to repeated bending, tension, and friction due to suction plates and rolls. Therefore, it is impossible to use the same wire cloth for a long period, and the life of use is only about 20 days. Therefore, conventional a paper making machine must be frequently put out of service for a time for exchange the wire with a new one, and continuous operation of the machine is impossible. Moreover, any folds or bends which may be formed on the wire cloth during fitting to the machine will result in wire marks on the surface of the paper and will accelerate abnormal abrasion to make the wire unusable. Thus, there is now a great demand for screens for a paper machine which can replace the metallic ones.

The object of the present invention is to provide new papermaking screens free from above described shortcomings.

This invention relates to a method for manufacturing an endless screen for a papermaking machine characterized by impregnating and coating yarns of natural or artificial fiber with a mixed solution of a resin to be rendered thermosettable by a curing agent and a curing agent sufficient in amount to partly cross-link said resin to a thermoplastic state, heat-treating said coated yarns to cross-link the resin and then making an endless screen using said coated yarn at least as the wefts, and either heat-setting said screen under tension in the warp direction, and then applying a solution of curing agent to the screen to complete the curing of said resin, or applying a solution of curing agent beforehand to said endless screen and then heating the screen while keeping it under tension in the warp direction, thereby concurrently accomplishing heat-setting of the screen and curing of resin.

Among the fibers suitable for the present invention include natural fibers such as cotton, silk, jute, and wool and synthetic fibers such as rayon, acetate, polyamide, polyester, polyolefin, polyvinyl, polyacrylic, polyurethane, and glass.

When screens woven of untreated twisted yarns of such fibers are subjected to longitudinal tension, the wefts are flattened and the spaces of the screen meshes are decreased. Further an endless screen woven with such untreated yarns has a tendency to deform the meshes to uneven spaces as the yarns are flexible. Said endless screen will readily expand and wrinkle by longitudinal tension. Moreover since the yarns are a bundle of fine fibers, then the screen wears out easily. Thus, the screens of such untreated natural or artificial fibers are unusable in papermaking. In order to overcome such disadvantages, one has treated such screen with various resins. However, according to such treatment, the weft and warp should be processed to the same degree of hardness and thereby evenness of the screen is damaged and thus wrinkles are produced on the finished screen. In order to prevent undue elongation of the screen on the paper machine, the screen must be resin-treated while being stretched in the running direction of the endless belt to decrease the bending rate of warp. Also, a certain amount of tension should be applied to the screen to prevent the shrinkage in width. If a screen of untreated yarns is stretched in the longitudinal direction, only a cloth having close meshes will result, because the weft yarns will be bent and flattened. Such screens cannot be utilized in actual paper production, because they have poor dewatering capacity from a wet web, and the productivity is sharply decreased. Moreover, it is very difficult to apply a resin uniformly on a screen woven in the form of an endless belt. Uneven deposition of the resin will result in irregular hardness and hence such fabric will become easily creased. Such a screen also cannot be used for papermaking. Furthermore, the resin solution to be applied to the screen must be diluted with a large amount of solvent in order to avoid packing of the meshes. This is disadvantageous both sanitarily and economically.

The object of the invention is to provide smooth and wrinkleless screens for paper making which are free from such shortcomings as noted above. According to the invention, screens for paper making machine are manufactured by using at least as the wefts treated yarns of natural or artificial fibers impregnated and coated with a mixture of a resin which is rendered thermosettable by a curing agent and a curing agent sufficient in amount to partly cross-link said resin to a thermoplastic state but insufficient to thermoset said resin, and heat-treating said yarns to partly cross-link the impregnating resin.

As the thermosetting resin to be used in the invention, any known two-liquid type thermosetting resin which can be cured by adding a curing agent may be employed. Such resins include phenol, epoxy, urethane, and polyester resins. Typical combinations of the resins and curing agents which may be used in the invention are a mixture of an epoxy resin and a curing agent such as a polyamide, polyamine, or acid anhydride; a mixture of an unsaturated polyester and a curing catalyst such as a vinyl monomer or benzoyl peroxide; a mixture of an alkyd polyester and a curing catalyst of metal oxide; a two-liquid type polyurethane resin consisting of a polyol or polyester containing hydroxyl groups and polyisocyanate; and a two-liquid type thermosetting resin consisting of a novolak type phenol resin and hexamethylenetetramine or a resol type phenol resin and a curing accelerator such as toluene sulfonic acid. These resins will become thermoplastic if about 5 to 50% of the active groups contained in the resin are cross-linked by means of a curing agent. But in some kind of resins, the amount of the active groups cross-linked differs from the above-described range. The resin for impregnating and coating the yarns is suitably empolyed in an amount of 5 to 30% by weight of the yarns. If the resin is used in an amount of less than 5%, sufficient hardness is not given to the wefts in finished screen. On the other hand, if the resin amount exceeds 30%, the yarns will become like monofilaments and the weaving capability is impaired. When the yarns are treated nonuniformly the yarn size becomes too irregular for weaving to a screen for paper making. Further, the excess resin decreases the flexibility and bending resistance of the twisted yarns, especialy after the subsequent curing treatment, and the screen woven with such yarns becomes defective because many cracks will appear in use on the paper machine.

The endless screens according to the invention may be manufactured either by means of circular weaving or by first weaving a broad width fabric and then sewing the ends together. In case of the circular weaving, endless screens having the resin-treated yarns as the wefts are obtained by weaving a hollow cloth using the resin-treated yarns as warps, and then cutting the hollow cloth laterally. If it is required to produce a screen having ends, the resin-treated yarns may be employed as the wefts. In any way, it is a feature of the invention that resin-treated yarns are used as the weft crossing the longitudinal direction of the endless screen. If required, the resin-treated yarns may be used also as the warps.

In an endless screen according to the invention wherein resin-treated yarns are employed at least as the wefts, the yarns running in the longitudinal direction of the endless belt, that is, the warps, are maintained in a state bent by the resin-treated wefts. Tension is applied to the screen in the direction of warps so that the degree of the bending of warps (tentatively called the bending rate) is kept below 2% of the total warp length. According to the invention, this tensioned state can be readily attained since resin-treated flexible yarns are used as the wefts. The stretched screen is heat treated at a temperature range from 100° to 250° C. to heat-set, while it has a predetermined width by stretching. To the screen is applied a solution of curing agent sufficient for completing the curing of the thermosetting resin in and on the weft yarns. Then, the screen is allowed to stand at a room temperature thereby to finish the curing of the resin. Alternatively, the curing and heat-setting are simultaneously carried out after the application of the solution of curing agent. Although not limitative, when more than 70% of the active groups in the resin are cross-linked, the curing will be completed. If both hems of the screen tend to get loose, the hems may be reinforced by applying a large amount of a thermosetting resin to pack the meshes over an appropriate width along each hem.

As already described, any kind of thermosetting resins such as phenol, epoxy, polyurethane, and polyester resins are employed in the invention provided that their hardness will increase with the use of a curing agent. These resins may also contain other additives or other synthetic materials. Generally, these thermosetting resins have characteristics of very high solubility in solvents before cross-linking with a curing agent and great hardness and chemical resistance after sufficient cross linking. In this invention, the resin-treated yarns for screens must possess a certain degree of resistance to solvents and sufficient flexibility for weaving. Therefore, it is important that certain amount of the curing agent must be initially added to the thermosetting resin. If the yarns are impregnated with a solution of a resin free from any curing agent, the resin may readily dissolve out by the solution of curing agent during final curing finishment. Also, in such case, sufficient resistances against solvent, chemical, and abrasion will not be imparted to the yarns because of incomplete internal cross-linking. Moreover, a good adhering effect is not attained between the resin and yarn and a hardness difference will be produced between the cured surface and inner part of resin. As a result, the surface of resin will be cracked by bending and the resin will come off the yarn. On the contrary if the yarns are impregnated and coated with a thermosetting resin premixed with sufficient amount of a curing agent to completely cure the resin, the cross-linking reaction will proceed during impregnation or coating resulting in unevenness of the hardness of the yarns, and the formation of smooth screen will become impossible. Furthermore, the yarn treated in this manner tends to harden during storage, thereby losing weaving capability. Furthermore during storage of this treated yarn the activity of the curing agent is impaired by hydration or by absorption of moisture under the influence of humidity. Further if the yarns are previously impregnated with a resin solution containing a sufficient amount of curing agent for complete curing and then are completely cured before weaving, these yarns are too hard for weaving or if possible to weave, the applied resin will be pulverized and stripped off the yarns by impact and bending.

The resin-treated yarns according to the invention have no such shortcomings as described above and have good weaving properties and processability. According to the present invention, the yarns are treated with a resin solution containing a curing agent in an amount sufficient to crosslink 5 to 50% of the active groups of the resin and partially cured, so that they have good flexibility and weaving capability and also the resin is never driven off the yarns by impact and bending because of low degree of cross-linking. The yarns treated in this way can have a long storage life without any change in properties and may at any time be used for the weaving purpose.

According to the present invention, when a solution of curing agent is applied to the yarns of the screen, the resin does not dissolve out of the yarns and the penetration of the curing agent is suitably accomplished. The difference in the hardness of the cured surface and the inner part of the yarns is limited to a very low degree and the resin is deposited on the yarn surface as a continuous layer. This solution of the curing agent may contain any curable resin or other thermoplastic resins in order to improve properties described above. Practically, therefore, the resin will not crack, come off, or wear when the yarns are subjected to bending and friction. This combines with increased chemical resistance to make the screens of yarns most suitable for paper making. The partly cross-linked resin described above can be applied to the yarn very uniformly, and the absence of any unevenness of the resin layer precludes the possibility of wrinkling. Another feature of the resin-treated yarns in accordance with the invention resides in that a woven screen can be readily formed by heat setting into a desired shape because the resin coated on the yarns is partly cross-linked and possesses a thermoplastic property. Thus, the screen after subsequent curing attains a highly stabilized configuration.

According to the invention, yarns are treated with a resin containing, as described before, a curing agent so that the resin is rendered thermoplastic, that is, about 5 to 50% of the active groups of the resin are cross-linked. If the degree of cross-linking is too low, for example below 5%, the yarns cannot be woven because they become too sticky or the adhering power of resin to yarns is lost. Thus, the resin becomes solvent soluble and dissolves out of the yarns upon the application of the curing agent. The solvent having dissolved resin from the coating forms a viscous liquid and tends to form a film over the meshes, thus causing a state generally known as packing. On the other hand, if the degree of cross-linking is too high, for example more than 50%, the resin becomes too hard and makes weaving difficult or the coated resin will be cracked and powdered by impact or bending. Moreover, under longitudinal tension for finishing a screen, such hard wefts are difficult to bend by warp tension and no appropriate bending rate can be attained. Of course, the degree of cross-linking varies depending on the kind of resin used.

According to the present invention, a screen is woven by using yarns treated as described at least as the wefts in the direction lateral to the endless belt, stretching the endless screen, and applying a solution of curing agent to the screen either before or after heat-setting.

The solution of curing agent may be applied to the screen by any conventional applying way such as by spraying, dipping and rolling. The amount of the curing agent may be rather small enough to sufficiently cure the resin coated on the screen. Any dissolving out of the impregnated resin into this solution does not occur, because the impregnated resin has been partially cured. The method of the present invention is advantageous both in economics and in operation. Since the solution of the curing agent has low viscosity, it may be used at a fairly high concentration. The screen manufactured according to the present invention has no possibility of being wrinkled by the longitudinal tension, because the wefts become hard by the thermosetting resin. During the paper making operation, the screen will not contract in the width due to the bending of wefts by warps. As the screen is stretched strongly in the longitudinal direction during the treatment, the wefts are sufficiently bent while in a flexible state, and are heat set and cured just as it is. The screen is highly stabilized in dimensions because it undergoes no deformation or change of length in the lateral direction and there can be no further elongation of warps.

The surface of the screen according to the present invention shows good abrasion resistance since the warps are not on the surface because they are enclosed by the wefts covered with cured resin.

According to the invention, thus resin-treating the warps of the screen is not always necessary, and uncoated warps are rather preferable, because such a screen is more flexible and can endure repeated bending on the paper machine.

The screen prepared according to the present invention is flexible in the longitudinal direction and can fold with ease. It can therefore be packed, transported, and mounted on the paper machine most readily and efficiently. During preparing the screen, the yarn size is not changed at all and the mesh spaces of the screen never decrease, since the wefts do not flatten because they are hardened by the treatment with resin. The warps, either treated or untreated, are kept under tension, thereby the volume that is to say thickness of the screen is maintained at the minimum and greatly increases the water filtration efficiency in paper making operation.

Because of the coating with a thermosetting resin, the screen according to the present invention can maintain good abrasion resistance against friction in use, without any softening due to the heat of friction as with a thermoplastic resin. A screen coated with a thermoplastic resin or formed of thermoplastic resin monofilaments has a tendency of softening and deforming by the friction heat and has a low abrasion resistance.

As has been described above, this invention provides endless screens for paper making which possess high abrasion, chemical, and bending fatigue resistance and good water filtration property, and which are non-creasing, flexible, dimensionally stabilized, light in weight, and easy to handle.

EXAMPLE 1

A yarn is formed by twisting three 840-denier 6-nylon multi-filaments each consisting of 96 monofilaments. A mixed solution is prepared by mixing an epoxy resin having the epoxy equivalent of 190 and tetraethylene pentamine at a ratio of 100 to 3 and adding a mixed solvent of methyl ethyl ketone and toluene to a concentration of 30%. The yarn is continuously impregnated and coated with the mixed solution by conventional roller coating technique. The impregnated yarn is heated at 190° C. for one minute to remove the solvent and partly crosslink the resin.

The treated yarn is woven on a circular weaving machine after having been warped to a width of 12 meters at a rate of 16 warps per 25.4 mm., with a yarn prepared by twisting nine 250-denier multi-filaments each consisting of 24 monofilaments of polyethylene terephthalate fiber used as wefts at a rate of 18 wefts per 25.4 mm. The hollow cloth thus woven is cut laterally with respect to the weaving direction to a width of 3.5 m. to obtain an endless screen 23.5 m. in length and 3.5 m. in width. This endless screen has polyester fiber yarns as the warps in the direction of endless belt and treated nylon yarns as the wefts, and weighs 33 kg. The endless screen is applied on two rolls and stretched until the screen is elongated to a length of 23.9 m. As the rolls are rotated, the screen is heated at 190° C. for four minutes while the width of screen is kept as it is by a clip tenter. Then, the screen is coated with a 30% methyl ethyl ketone/toluene mixed solution of tetraethylene pentamine with applicator rolls. The solution is applied to the screen in an amount of about 1.7 kg. At the same time, to the both edges of the screen is applied over a width of 5 cm. each, a 50% solution containing the epoxy resin and a polyamide resin (amine value 220) at a ratio of 6 to 4. The screen treated in this manner is dried by blowing hot air, and then is heated at 150° C. for 20 minutes to cure the applied resin. An endless screen thus obtained has straight warps and sufficiently bent wefts in position. It has 20 meshes and 16 wefts per 25.4 mm., and has a length of 23.9 m., a width of 3.2 m. and weighs 34 kg. This endless screen is suitable for use on a paper machine, particularly for pulp process.

EXAMPLE 2

A yarn is formed by twisting three 210-denier multi-filaments each consisting of 10 monofilaments of 6-nylon. A mixture is prepared by mixing a polyester having an OH value of 380 consisting of adipic acid, diethylene glycol, and trimethylol propane with a curing agent consisting of a reaction product of hexane tolyol and 2,4-tolylene diisocyanate at a ratio of 100 to 45 and by dissolving the mixture with methyl ethyl ketone to a 30% solution. Using applicator rolls, this resin mixture is applied to the nylon twisted yarn in an amount of 20% to the total weight of yarn and is partly cured by heating at 180° C. The treated nylon yarn is warped for weaving a hollow cloth having a width of 10.5 m. at a rate of 28 warps per 25.4 mm., with wefts formed by twisting six 100-denier polyester fiber twines each consisting of 48 mono-filaments with picks of 30 per 25.4 mm. An endless screen 20.3 m. in length and 2.5 m. in width is obtained by cutting the cloth thus woven to a width of 2.5 m. in the lateral direction to the weaving direction. It has warps of polyester fiber yarns and wefts of treated nylon yarns. Then, the endless screen is rounded and immersed in a 40% solution of the curing agent, and is squeezed so that it contains 700 g. of the solution of curing agent. Then the screen is applied on two rolls and is stretched to a length of 21 m. While maintaining the desired width, the screen is heated at 150° C. for 3 minutes to remove the solvent. It is further heated at 180° C. for 5 minutes to simultaneously effect the reaction between the curing agent and the resin applied on the wefts and the heat-setting of warps and wefts. To both hems of the screen over a width of 5 cm. each is applied a 50% solution prepared by blending equivalent amounts of a polyester and a curing agent. The resin thus applied is cured by heat treatment. The screen formed in this manner has a length of 21 m. and a width of 2.3 m., weighs 10.5 kg. has a a size of 32 meshes and picks of 28 wefts per 25.4 mm. This endless screen is quite sutiable for kraft paper making.

I claim:

1. A method for manufacturing an endless screen for a papermaking machine, which comprises impregnating and coating yarn with a mixture of a resin which is thermosettable with a curing agent and a curing agent in an amount sufficient to partly crosslink the active groups of said resin in the range of from 5% to 50% to a thermoplastic stage, heat-treating said yarn to partly crosslink said resin, making an endless screen using said yarn at least as the weft, applying to said screen a solution of a curing agent in an amount sufficient to fully cure the resin coated on the yarn, and heating said screen while stretching the same in the warp direction simultoneously to effect heat-setting and curing of the resin.

2. A method of manufacturing an endless screen for paper making as defined in claim 1 wherein the thermosettable resin used is an epoxy resin.

3. A method for manufacturing an endless screen for paper making as defined in claim 1 wherein the thermosettable resin used is a polyurethane resin.

References Cited

UNITED STATES PATENTS

| | | | |
|---|---|---|---|
| 3,192,599 | 7/1965 | Wagner | 28—74 |
| 3,224,182 | 12/1965 | Sloan | 28—76 X |

LOUIS K. RIMRODT, Primary Examiner